June 30, 1959 W. R. JOHNSON 2,892,886

METHOD OF MULTIPLE TRACK RECORDING

Filed May 9, 1955 2 Sheets-Sheet 1

INVENTOR
WAYNE R. JOHNSON
BY Lippincott & Smith
ATTORNEYS

METHOD OF MULTIPLE TRACK RECORDING

Filed May 9, 1955

INVENTOR
WAYNE R. JOHNSON
BY Lippincott & Smith
ATTORNEYS 2,892,886
Patented June 30, 1959

2,892,886

METHOD OF MULTIPLE TRACK RECORDING

Wayne R. Johnson, Los Angeles, Calif., assignor, by mesne assignments, to Minnesota Mining & Manufacturing Co., St. Paul, Minn., a corporation of Delaware Application May 9, 1955, Serial No. 506,817
12 Claims. (Cl. 178—6.6)

Figure 1:
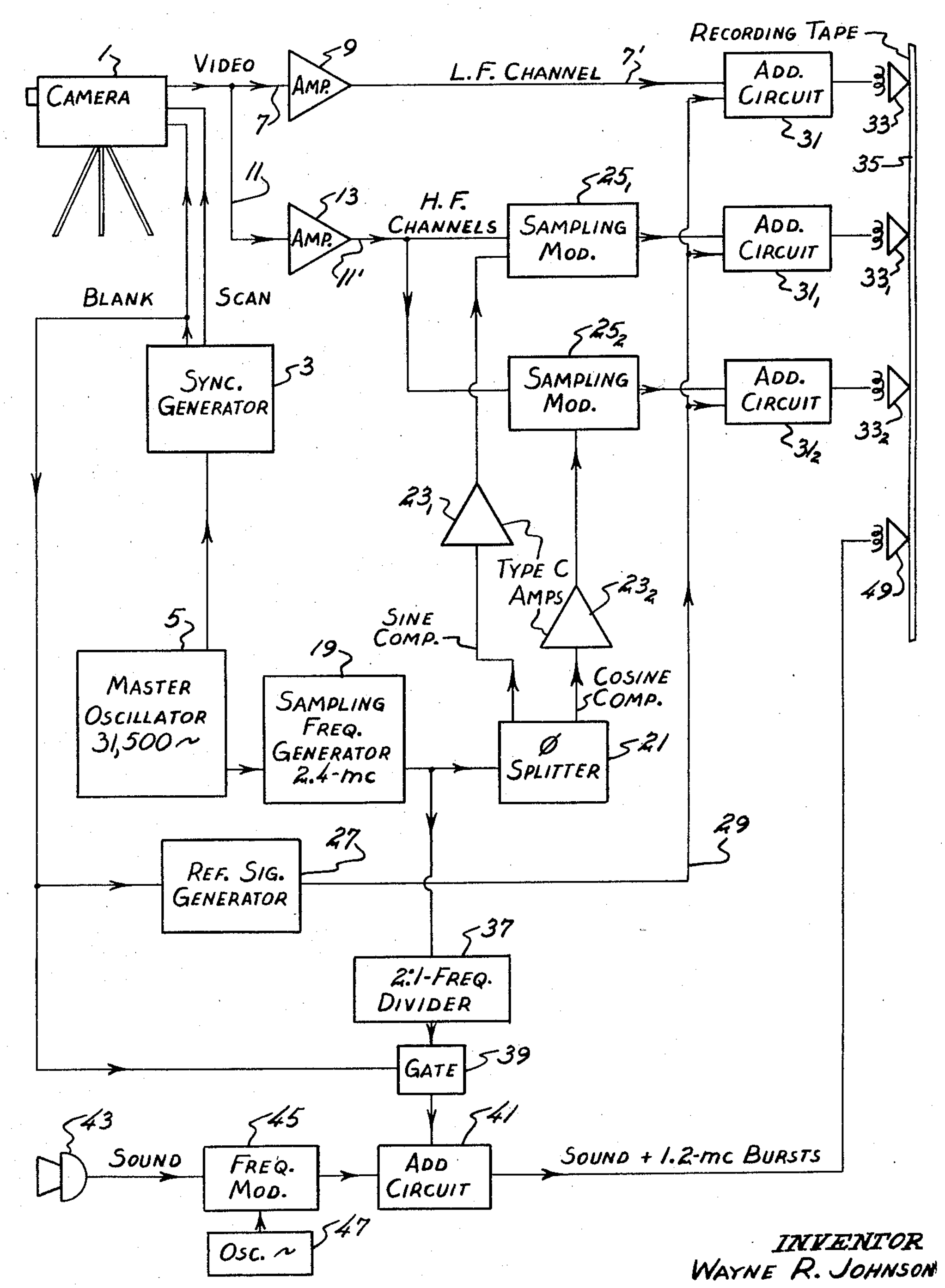

This invention relates to the recording of wide band signals, such as television or radar signals which are produced by repeatedly scanning a field or view of examination. More specifically, it relates to the division of the information obtained in such signals into a plurality of channels in such a manner that the higher frequency components of the original signals are transposed into a lower frequency band, whereby the signals in all of the channels can be recorded and reproduced simultaneously, employing a medium which is progressed too slowly to record the high frequency components directly, and reassembling the signals after reproduction so as to restore the recorded signal in substantially its original form.

All methods of recording and reproducing electrical signals now known have an inherent high cutoff frequency above which the reproduced signals are either greatly attenuated or not reproduced at all. The cutoff frequency depends upon the speed of the recording medium and the size of the element used for picking up and reproducing the recorded signal. In magnetic recording, which is the method which, up to the present, is capable of reproducing the highest frequencies, this recording element is a gap in the magnetic circuit of a transducer head. At the frequency where the recording medium is advanced by the effective length of the gap in one cycle there is absolute cutoff, and as the absolute cutoff frequency is approached, the signal falls in intensity very rapidly. Theoretically, some signal is recorded, in reverse phase, at frequencies above the absolute cutoff; in magnetic recording frequencies above the absolute cutoff are not reproduced owing to self and mutual demagnetization of the "cells" of magnetization which would be required to produce these higher frequencies.

A more practical measure than the absolute cutoff of the ability of a recording and reproducing system to operate upon high frequencies is the effective cutoff, where the signal reproduced has fallen to half power, and in the remainder of this specification it will be this half-power value which is referred to when "cutoff" is mentioned.

With the best recording media which have been produced to date, and with transducer heads having the shortest gaps that can be used effectively, cutoff occurs at about 9,000 cycles per inch of record track. Television signals occupy a band of frequencies from zero to four megacycles per second under present standards of transmission. The zero or D.C. component is usually supplied by a D.C. restorer, and as few receivers are capable of reproducing the highest frequencies in this range very satisfactory reproduction can be achieved by frequencies in a band extending from 60 cycles to about 3.6 mc. To record a frequency band of this width upon a single track, at 9,000 cycles per inch, requires that the recording medium (usually a tape coated with magnetic material) be advanced at a rate of about 33 feet per second. At this rate the record of a 15 minute program requires nearly six miles of tape. With even the thinnest tapes such a record is bulky, inconvenient, and expensive. If the information in the signal can be divided between two or more tracks and reassembled satisfactorily the amount of record material can be reduced in inverse proportion to the number of tracks used, and, since much information on a television signal is redundant, to an even greater extent under certain circumstances: for example, it can be reduced to ⅓ with two video tracks or to ¼ with three.

What was probably the first attempt made to divide the information on a television signal among a number of tracks involved techniques familiar in carrier telephony. The original signal was first divided into a number of frequency bands by means of conjugate electrical filter networks. Each higher frequency band was then frequency-shifted by the heterodyne method, the band being modulated onto a carrier frequency so chosen that the lower sideband lay within the range below the high-frequency cutoff of the reproducing apparatus. After reproduction the various signal bands were then demodulated by heterodyning against the original carrier frequency, the lower sidebands being again selected to reconstitute portions of the original signal and the signals of the resulting channels added to form the complete television signal.

This system has been found, in practice, to present almost insuperable difficulties. Electric wave filters of the bandpass type required to select the frequencies to be recorded on the various channels produce a relative phase displacement between the lower and upper frequencies of the pass band and since television signals must be reproduced in substantially their exact original phase in order to constitute a satisfactory signal, this alone was sufficient to cause the modulations or heterodyne system of band-splitting to be discarded by most experimenters.

A second system, advanced by the present inventor, involves sampling the television signal cyclically at successive intervals, successive samples however being recorded on different tracks. In practice, a carrier wave of materially lower frequency than the highest to be reproduced is developed and from it are derived alternate positive and negative pulses whose repetition rate is the frequency of the carrier wave. These pulses are applied to encoders or sampling switches in a number of channels in succession. The pulses representing the samples are recorded as modulated waves of the sampling frequency. It is these waves that are reproduced and are sampled in the same order as that in which they were recorded, to produce a series of pulses which are reassembled to reconstitute substantially the original signal. This method avoids the phase distortions introduced by filtering systems. It also avoids a second type of phase distortion which can be introduced owing to a relatively misalinement of the recording and reproducing heads, or to an effective, instantaneous misalinement, due to flutter and skew of the tape, which causes the tape, instantaneously at least, to cross the heads at an angle, even though they may be properly alined with respect to the average angle of attack of the heads to the tape. As used in the past, however, this system has required a larger number of channels than would be theoretically required by the modulation and heterodyning system of multiple-channel recording, although this limitation is not an inherent one.

The present invention involves a method of frequency division which has features in common with both the heterodyning and sampling systems. It is directed primarily to the method of dividing and reassembling the signal so as to avoid phase distortions of the conventional filter systems, the distortions due to head misalinement, flutter and skew being covered by a separate application, but also shown here for the sake of completeness.

Among the objects of the present invention are to provide a method of dividing a wide band of frequencies into a number of narrower bands without causing a relative phase shift of the frequencies within the respective bands; to provide a method of recording and reproducing television signals, without phase shift, on a limited number of tracks, and upon a medium traveling at a rate of speed which is in inverse proportion to the number of tracks used as compared with the rate which would be required in recording on a single track; to provide a method of recording whereby a television or other similar signal having redundant information can effectively be reproduced from a number of tracks still smaller than that corresponding to the ratio by which the speed of the recording medium has been reduced; and to provide a means and method of dividing signals in a wide band of frequencies into channels representative of narrower frequency bands which is economical and simple as to first cost of the apparatus employed, maintenance, and adjustment.

In accordance with the invention the higher component frequencies of the signals which are to be recorded on a single track are selected by sampling the entire signal cyclically to produce a train of pulses wherein alternate samples are reversed in sign, the repetition rate of samples of like sign being equal to the maximum frequency to be recorded on a given track, minus the cutoff frequency of the reproducing equipment; i.e., the sampling frequency is above the cutoff of the apparatus used. Sampling of this character can be considered, from one aspect, as a modulation process, and can be accomplished by any type of modulator which will suppress the carrier frequency, as for example, a double-balanced, ring modulator, such as is used generally in telephone practice. The sampling repetition frequency can be considered as the carrier frequency, and this frequency may, if desired, be applied as a sine wave with fair results. Better practice, however, is to convert the carrier into a series of sharp pulses, the duration of which is not greater than a quarter-cycle of the carrier or sampling frequency, so that each successive pair of positive and negative samples are separated by a gap which is equal in length to the length of the samples. In so sampling television signals the frequency used is preferably an odd harmonic of one-quarter the line scanning frequency, so that in successive scannings of the same elements of a picture field the samples taken in the later scanning are of the portions of the field which fill the gaps not sampled in the preceding sampling. For best reproduction the signal to be recorded is simultaneously sampled in the same manner with the same carrier frequency but with the carrier wave in quadrature with that used in the sampling first described. The resultant train or trains of signals contain as modulation products frequencies which are equal to the sums and differences of the sampling frequency and the frequencies of the sampled signal, and these signals are supplied in toto to the recording head.

In reproduction only the frequency components of the recorded waves which are lower than the cutoff frequency of the reproducing equipment will be reproduced. The frequencies so reproduced comprise two completely overlapping bands, each extending from zero to the cutoff frequency of the reproducing equipment. The first of these bands is a portion of an inverted lower sideband, its frequency components being the sampling frequency minus the signal frequencies. The frequencies in the second band are equal to the signal frequencies minus the sampling frequency; the frequencies in this second band are not inverted. The resulting signals therefore represent frequencies comprised in a band of double the width of the band which is directly reproducible by the equipment used. The upper and lower frequencies represented in this double width band of frequencies will both be reproduced at the cutoff frequency, while the center frequency of the band is represented by "zero frequency." All higher frequencies resulting from the modulation processes are effectively filtered out by the aperture and demagnetizing effects which have already been referred to, and it is a characteristic of the filtering due to the aperture effect of the gap that no relative phase shift is involved in the filtering process.

The train or trains of signals thus reproduced appear in the pick-up circuits as waves of varying amplitude and period, with their half-cycles approximately the shape of half-cycles of sine waves. These half-cycles are again sampled in the same manner as was the original signal in the recording process, successive samples being reversed in the same manner to produce a resulting train of pulses which are in proper phase to reproduce, in each train, one-half of the information conveyed by the band of the original signal recorded on the corresponding track. The other half of the information is represented by the samples taken in quadrature with the original samples on the second track, if the latter is used, or if the large amount of redundant information in a television signal is relied upon, the gaps in this information are supplied in the next scanning of the same area by the samples then taken.

The lower frequencies, not included in the band thus recorded, are preferably supplied directly to a recording head, and the higher frequencies filtered out by the reproducing gap. The sampling frequency is so chosen that the cutoff of the higher and lower bands is the same, the bands overlapping at their half-power points.

It will be noted that this method of frequency division implies that certain frequency components, lying very close to the sampling frequency, will be represented in the recorded signals, by components of "zero frequency." It is well known that magnetic recording systems have a low-frequency cutoff as well as the high-frequency cutoff imposed by the aperture effect. It might be assumed, therefore, that certain elements of the recorded picture would be absent, due to their representation by such "zero frequency" components. That this is not, in fact, the case is due to two, quite separate facts. The first of these is that the sampling frequency specified above is one which does not appear in any marked degree in the television signal, the frequencies whereof are closely grouped around the harmonics of the line frequency. The second and more important is that the higher-frequency components of the signals which are sampled occur in the form of transients of relatively brief duration and that therefore, while a few successive samples might be taken in which the intensity of one of the components close to the sampling frequency would be represented by a constant amplitude signal, the resulting "D.C. component" cannot persist long and hence the actual signal resulting is one which is readily reproduced.

Figure 2:
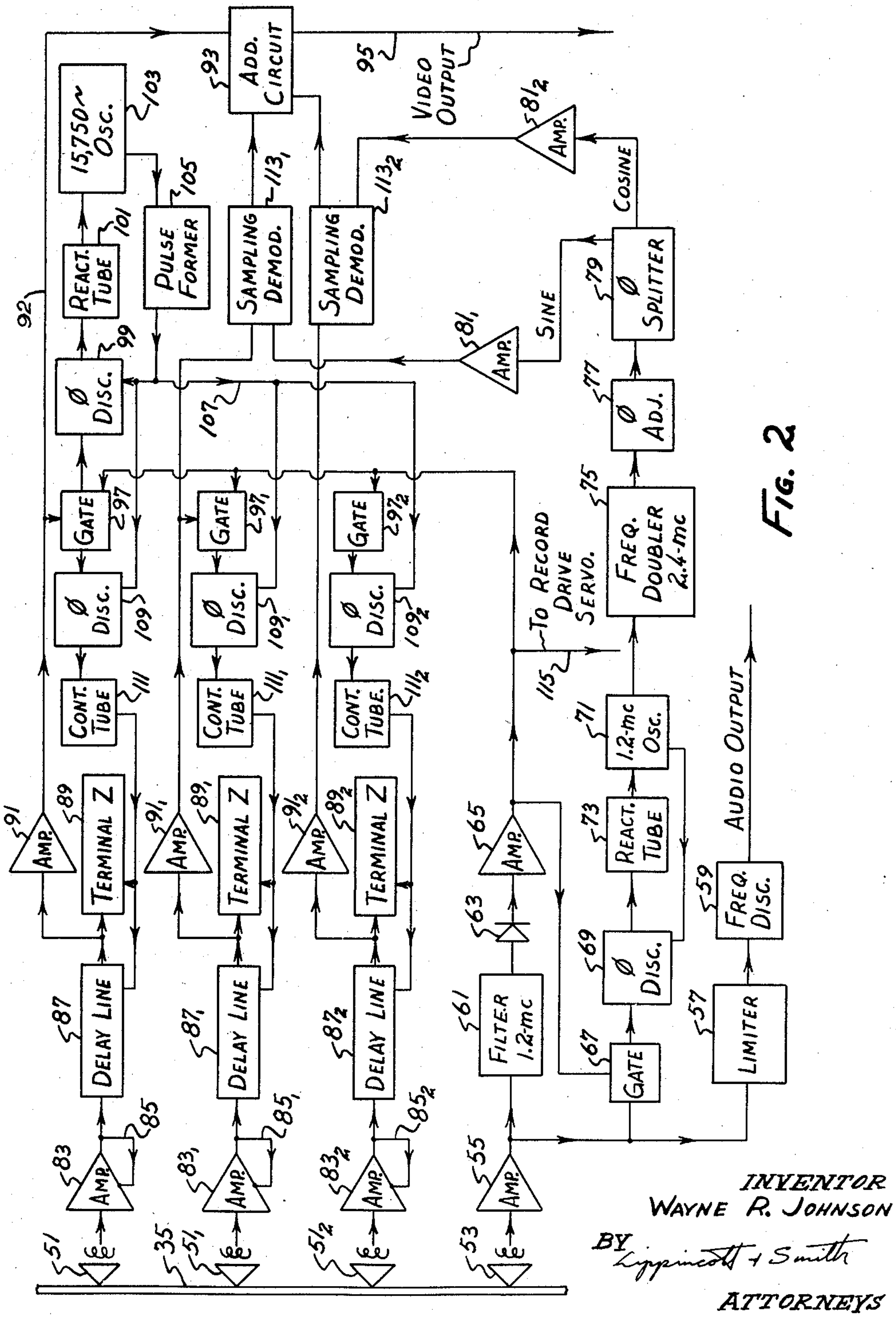

The invention will be more fully explained and its various advantages will be more readily understood by a description of the apparatus employed in a preferred form of the invention, these explanations being illustrated by the accompanying drawings wherein:

Fig. 1 is a block diagram of the apparatus employed in recording a television signal in accordance with the present invention; and Fig. 2 is a similar block diagram of apparatus employed in reproducing the signal and combining the information conveyed on the various channels to restore substantially the original signal.

In the recording apparatus of Fig. 1, the signals to be recorded are assumed to be developed by conventional television camera 1, which is supplied with its scanning, synchronizing and blanking signals from a conventional sync generator 3. Such generators are conventionally driven by a master oscillator 5, accurately controlled to operate at double the standard line frequency of 15,750 cycles, or 31,500 cycles. If the signals are to be transmitted in color, frequencies differing very slightly from those mentioned will be used, and additional video channels besides those which are to be described will be required, but the description of a black-and-white system is adequate to describe the invention and the additional complication of the diagram which would be involved in illustrating a color system is therefore not believed to be warranted.

The signal developed from the camera 1 is supplied through line 7, and amplifier 9 to one channel of the recording equipment, through line 7'. A branch line 11 supplies the same signal to a separate amplifier 13, the output of which supplies the remaining channels through line 11'.

The signal thus supplied to the lines 7' and 11' includes a blanking signal, ordinarily of a little less than 9 microseconds duration, but no synchronizing signals. During the major portions or about 8 microseconds of blanking intervals, recurring at the line repetition rate of 15,750 cycles per second, the signal falls to zero in all channels.

The master oscillator 5 also feeds a sampling-frequency generator 19, which develops, by frequency multiplication, intermodulation, or other well known methods, a sampling frequency which is an odd harmonic of one-quarter the line frequency. In the apparatus illustrated it is assumed that frequencies are to be reproduced up to 3.6 mc. on three channels and that all information carried by the frequencies within the band is to be recorded and reproduced with equipment having a high frequency cut-off of 1.2 mc.

With this arrangement the lower-frequency components, up to 1.2 mc. are recorded directly. The higher-frequency signals, from 1.2 to 3.6 mc. are to be recorded by the sampling method. The sampling frequency chosen is therefore that midway between the 1.2 and 3.6 limits, or 2.4 mc. and the frequency developed by the sampling frequency generator 19 will therefore be of approximately this value. Actually the frequency employed will be the odd harmonic of one-quarter of the line frequency which lies closest to this value and can be conveniently generated. It may, for example, be the 603rd harmonic of one-quarter the line frequency, or 2,374,312.5 cycles per second. For convenience, however, this will be referred to hereinafter as the "2.4 megacycle frequency."

The sampling frequency provided by the generator 19 is supplied to a phase splitter 21, of conventional form, which derives from the waves supplied to it sine and cosine components: i.e., waves of equal frequency supplied in quadrature to two output circuits. The sine component is amplified by a type C amplifier 23, and thence fed to a sampling modulator $\mathbf{25_1}$ to serve as a carrier component upon which the signals from line 11' are sample-modulated. The cosine signals are supplied to an identical amplifier $\mathbf{23_2}$ and sampling modulator $\mathbf{25_2}$, to be modulated by the same signals as those modulated by modulator $\mathbf{25_1}$, but with the sampling in the two channels occurring alternately. The type C amplifiers are so biased that only the peaks of the sinusoidal waves supplied to them from the phase splitter are passed, so that the period of sampling is confined to 45° on each side of the peak of the carrier waves. The use of such amplifiers is a desirable but not a necessary refinement, resulting in better definition of the recorded and reproduced images. Other types of apparatus for obtaining relatively short pulses of carrier frequency can be used, but that suggested is one of the simplest and most convenient.

Since the apparatus in the two high-frequency channels is identical, it is throughout identified by the same reference characters, that in the two chanenls being distinguished by subscripts 1 and 2. Mention of a reference character without reference to its subscript indicates that the corresponding apparatus in both channels is intended.

Sampling modulators 25 can be of any type which will give double sideband, suppressed carrier modulation, and can conveniently be the double-balanced ring modulator type familiar in carrier telephone practice.

In order to avoid phase distortion due to mechanical as well as electrical factors, there are added to the signals recorded on each track a reference signal, supplied for the purpose of phasing the reproduced signals, and while the correction of the mechanical phasing errors is not per se a portion of the frequency division aspect of this invention, some arrangement for accomplishing the result is necessary for attaining its full value. The reference signals are added to the signals which are recorded during the blanking intervals when no other signals are transmitted on any of the channels. The reference signal used is timed by a signal derived from the blanking signal, developed by the sync generator 3. The blanking signal is supplied to a reference signal generator 27, and comprises a pulse occurring preferably 2½ to 3 microseconds after the start of the blanking interval, the pulse being of "white level" and rising as sharply as possible to the maximum value.

The reference signal pulse is supplied through a line 29 to adding circuits in each of the recording channels, the adding circuit in the low-frequency channel being designated as 31 while those in the two high-frequency channels are designated as $\mathbf{31_1}$ and $\mathbf{31_2}$ respectively. The three separate channel signals are supplied to recording heads 33, $\mathbf{33_1}$ and $\mathbf{33_2}$ and simultaneously recorded on the recording tape 35. As it has been assumed that the cutoff frequency of the recording and reproducing equipment is 1.2 mc. a steep wave front such as is applied by the reference signal will have a rise-time of one-half the period of this frequency, or approximately 0.4 microsecond. This signal is recorded, together with the picture frequencies at a repetition rate of 15,750 per second, and since it is injected into the channels subsequent to the sampling process it appears in the same form in all channels.

It is also necessary to provide in the record some means of developing 2.4 mc. signals for sampling the reproduced wave and to provide these signals properly phased with respect to the recordings so that the sampling of the various wave trains occurs in the same order and phase relation as the original sampling. The 2.4 mc. frequency, being twice the cutoff frequency, cannot be recorded directly. To overcome this difficulty the sampling frequency from the generator 19 is fed to a 2 : 1 frequency divider 37 and thence supplied to a gate 39. This gate is also operated by the blanking signal from the sync generator 3, which closes the gate circuit during the blanking period to supply a burst of 1.2 mc. oscillations to an adding circuit 41.

The adding circuit in this case serves to impose the burst of the 1.2 mc. frequency as an amplitude modulation on a track carrying the sound which accompanies the television signal. The signals for this additional track are picked up by a microphone 43 and frequency-modulated by the modulator 45 on a frequency developed by an oscillator 47, the signals going from the modulator to the adding circuit 41 and thence to a sound-recording head 49. As will be shown in connection with the description of the pickup equipment which follows, the bursts of 1.2 mc. oscillations which are recorded with the sound exercises several functions. Since the frequency carried by the bursts, as well as the repetition frequency of the bursts, is quite different from any included in the sound channel, it would be possible to record it continuously, so far as the sampling frequency itself is concerned, but transmitting them as bursts has several advantages which will later become apparent. The length of the bursts is a little less than 9 microseconds; i.e., that of the blanking interval.

In the reproducing equipment, illustrated in Fig. 2, the tracks imposed upon the magnetic tape 35 are engaged by the reproducer heads 51, $\mathbf{51_1}$ and $\mathbf{51_2}$, the subscripts indicating the equipment associated with the channels bearing similar subscripts in the recording equipment. A reproducer head 53 engages the sound track.

Considering the sound channel first, the signals picked up by the transducer head 53 are passed to a preamplifier 55, and the amplified signals are thence supplied to three branch circuits. The first of these circuits carries the sound signals themselves, which first pass through a conventional limiter 57 and frequency discriminator 59 and thence to the audio output circuit for transmission. In another of the branch circuits the signals are fed to a narrow-band filter 61 (which may be merely a sharply tuned resonant circuit) which selects the 1.2 mc. frequency of the bursts. These bursts go to a rectifier-type detector 63 and are then reamplified by an amplifier 65. The rectified bursts form gating pulses which are used in various of the other circuits. It will be recognized that each of the rectified bursts is represented in the output of the amplifier by a substantially rectangular unidirectional pulse.

The third branch through which the signal from the sound channel is supplied leads first to a gate 67, which is operated by the pulses just described, and thence to a phase discriminator 69. This discriminator serves to control and stabilize the frequency of a 1.2 mc. oscillator 71. A portion of the output of this oscillator is fed back to the discriminator 69, and deviations of its frequency from its nominal 1.2 mc. value result in error signals from the discriminator, which, applied to a reactance tube 73, bridged across the oscillator tank circuit, correct the deviation and hold the oscillator frequency accurately on its designed value, in phase with the average frequency of the bursts, thus eliminating the effects of flutter or skew upon the frequency of the oscillator output. The 1.2 mc. oscillation thus developed goes to a frequency doubler 75 and the resultant 2.4 mc. wave is supplied in turn, to a phase adjuster 77, and a phase splitter 79. The phase splitter derives, from the 2.4 mc. frequency, sine and cosine components. These are amplified in type C amplifiers $81_1$ and $81_2$, to develop demodulating pulses substantially identical in character with the pulses used for modulating the two high frequency channels in the recording process.

In the equipment shown, the low frequency channel, supplied by the transducer head 51, is used as a "master channel" which controls the "slave channels" supplied by transducer heads $51_1$ and $51_2$. The master channel includes certain equipment not found in the other two, but much of the equipment is repeated in all three channels. Each of the three video transducer heads supplies an amplifier 83, the last stages of which are provided with a feedback loop giving 100 percent negative feedback, these final stages having unity gain and an output impedance which is very low, being only a fraction of an ohm. In each stage the amplifier supplies a delay line 87, the delay of which can be varied by the application of an electrical bias. One type of such line uses ferrite cores for its series inductive elements; the inductance can be varied by varying the saturation of the ferrite cores by means of a direct current superimposed on the signal current, either through the same winding or through a separate one. Each line is closed, at its output end, by a terminal impedance 89, the value of which can also be varied, by the application of an electrical bias, to match the impedance of the line.

The output circuit for the channel is a high impedance circuit, taken off in parallel with the terminal impedance. This circuit includes, in each case, a high gain amplifier 91. The output signals from each of the amplifiers are fed through a line 92 to an adding circuit 93 which combines the signals from all of the channels and supplies the reconstructed signals to a video output circuit 95, supplying either a video transmitter or a transmission line, as the case may be.

A branch circuit from each of the output lines 92 leads through a gate 97, which is in each case operated by the gating pulse from amplifier 65, supplied by the sound channel as has already been described. These gates pass signals only during the line-blanking periods.

One circuit from the gate 97, in the master channel only, leads to a phase discriminator 99. This discriminator forms part of a feedback loop of the familiar type wherein the error signal controls a reactance tube 101, bridged across the tank circuit of an oscillator 103 which operates at the line frequency of 15,750 cycles. The output of the oscillator is passed to a pulse former 105 which derives from the output of the oscillator 103 sharp pulses, preferably of about 0.1 microsecond duration, recurring at the oscillator frequency. These pulses are fed to a comparison-frequency bus 107, one branch from which leads back to the discriminator 99. The time-constant of this feedback loop is long in comparison with any frequencies which may be developed by flutter or skew of the tape and therefore the comparison pulses are maintained accurately on the average frequency (or, more properly, at the average phase) of the steep wave-front reference pulses which recur during the blanking intervals of the reproduced waves. It may be noted that the oscillator 103 may be incorporated in a standard sync generator and used for supplying the blanking and ordinary synchronizing pulses in the transmission of the reproduced signal.

The remainder of the equipment in the master channel is repeated in each of the other channels. Each of the gates 97 feeds a discriminator 109, which is also supplied with comparison signals, in the form of the 0.10 microsecond pulses, from the comparison signal bus 107 and pulse former 105. The discriminators 109 are provided with integrating circuits having time constants which are short in comparison with any frequencies developed by tape flutter or skew. These signals bias control-tubes 111, which provide the biasing currents or voltages for the delay line 87 and terminal impedances 89. Under certain circumstances the control tubes may themselves be incorporated in the terminal impedances 89, since the effective plate resistance of a vacuum tube varies with the space current. As this is not necessarily the arrangement used, however, the control tubes and terminal impedances are indicated as separate elements, even though the same instrumentality may be used to perform the dual functions.

The effect of this second feedback circuit, including the discriminators 109 and control tubes 111, is to maintain the outputs of the delay lines 89 accurately in phase with each other, the delays automatically adjusting themselves so that reference signals as they appear in the lines 92, occur simultaneously. Because of the very steep wave-fronts employed in the reference signals, the relative phasing may be held constant to less than $\frac{1}{20}$ microsecond. This implies a phase shift of less than 22° maximum, and that when the reproduced signals are sampled the samples will vary by less than 10% from their optimum value.

The signals in the two high-frequency channels, thus properly phased, are supplied to sampling demodulators 113, which may be identical with the sampling modulators 25, and they are demodulated by the pulses from the type C amplifiers 81. When the phase adjuster 77 is once set to bring the signals into phase so that the samples are selected in their proper order the adjustment is substantially permanent. The signals from the two sampling demodulators are supplied to the adding circuit 93, as indicated above, and since the sampled pulses from the two channels occur alternately the pulses in each channel fill in the gap between the pulses in the other to supply a complete information in the high-frequency band.

There are a number of factors which should be noted in connection with recording and reproducing signals in this manner. Since, with respect to the signals recorded in the high-frequency channels, only a single sideband is reproduced, carrying approximately one-half the energy represented by the entire information, the gain in these channels must be increased, in either the recording or the reproducing but preferably in the former, over the gain in the low-frequency channel. It is for this reason that separate amplifiers 9 and 13 are shown in the high- and low-frequency recording channels of Fig. 1.

In practice it is possible to omit one of the two high-frequency channels with very little loss in picture quality, provided the sampling frequency chosen is an odd harmonic of one-quarter the line frequency, as was specified above. With frequencies so chosen, the pulses in each successive scanning, as they appear in light upon the television screen, fall between the pulses of the preceding scanning. Because the information in a television image is very largely redundant, the signals transmitted in any frame being usually almost identical with those transmitted in the preceding frame except for the very small portion of the picture in which motion is occurring, the transmission of the high frequency information in this manner results in relatively little loss, although, of course, the gain in the single high frequency channel must again be approximately doubled to give the high frequency information the same relative brightness as the low frequency information as they appear on the screen.

The transmission of a single high frequency channel and the supply of the high frequency information in alternate frames results in the relatively low flicker frequency of 15 cycles per second. This low-frequency flicker is relatively unimportant for two reasons. First, in the great majority of television pictures, the high frequencies are of low amplitude in comparison with the lower frequencies, the amplitude being in inverse proportion to the frequency in the reproduction of the "step functions" which are characteristic of television transmissions, and which are responsible for the greater portion of high frequency components. Second, these high frequencies represent transients, and the areas which encompass them are relatively small. It is only in a narrow band at the edge of an abrupt transition that they can be detected at all. Finally, the dots produced by the flickering pulses are themselves very small and are of low contrast in comparison with the surrounding background. The result is that few observers can see the flicker unless it is pointed out to them. For many purposes, therefore, two channels are as effective in transmitting the information as are three.

The equipment illustrated in Fig. 2 will compensate for small variations in tape speed caused by variations in the tape drive mechanism. It is desirable, however, that this speed be kept extremely constant and means have been shown in the prior art for doing this. Such means, in general, require a reference signal of some sort which operates upon a servo mechanism controlling the drive. Such a signal may be furnished by the gating pulses from the amplifier 65, as is indicated by the lead 115.

The particular apparatus described is capable of reproducing a signal containing frequencies up to 3.6 mc. on a tape traveling at a speed of 11.1 feet per second, on two or three tracks, in contrast with the speed of 33.3 feet per second required if all of the information is to be recorded on a single track.

The system of frequency division is not limited to this number of tracks or this amount of speed reduction. The speed of the record may be reduced by any integral factor, by the division of the signal into additional bands recorded on additional tracks. An intermediate band, between the directly recorded low frequencies and the sampled high frequencies can be sampled in the same manner as the high frequency band, with a reduction in tape speed by a factor of 5. Or, for example, to convey the same amount of information on a tape traveling at one-fourth the speed required for single track recording, the low-frequency band may itself be divided in somewhat the same manner as the high-frequency band. The lower tape speed would reduce the high frequency cutoff of the apparatus from 1.2 mc. to 0.9 mc. Two sampling frequencies would be used in this case, a lower sampling frequency of 0.9 mc. and an upper sampling frequency of 2.7 mc. The recorded signals sampled by the lower of these two frequencies would cover a band from 0 to 1.8 mc., while those sampled by the upper frequency lie in the band from 1.8 to 3.6 mc.

For the upper one of these bands, recording on a single channel, with the information missed on one scanning supplied in the next, can be used in the same manner as was described in detail above. For the lower band, sampling by both sine and cosine components is practically necessary, for the D.C. and low-frequency components must be supplied by the signals in this band. Since the D.C. and lower frequency signals carry most of the energy the contrast is too great to give a really satisfactory picture when only half of the information is supplied in each scanning since the low flicker frequency becomes objectionable. The signals, however, can be recorded and reproduced from either three or four tracks under the same circumstances as the recording and reproduction from two or three tracks are used with the lower frequency band recorded directly. Such division of the low-frequency band, however, is to be distinguished from the high-frequency sampling that forms the primary feature of this invention in that the sampling frequency is reproducible, and is, in fact, a specific application of direct sampling.

For certain military or like purposes, where flicker can be tolerated so long as the necessary information is conveyed, a 4:1 reduction of speed can be accomplished with two tracks only. Because, however, television signals are ordinarily recorded for fifteen minute intervals and tapes traveling from one-third to one-fourth the speed required for single-track recording are not excessively bulky and can be handled with relative ease, the use of more than three or at the most four video tracks is not usually justified, since the reduction in recording medium must be compensated by additional channel equipment.

The particular system here shown for compensating phase displacements due to mechanical variations in the reproducing process is not the only one which can be used to effect this result. In his prior United States Patent No. 2,694,784 the present inventor has shown a method of storing reproduced signals, representative of a pure sampling process, in memory condensers, for a period long enough to compensate for any phase distortion due to mechanical causes, and of sampling the stored signals at the proper epoch and in the proper order to reconstitute the original signal. In the reproducing arrangement here shown the signals are in effect stored in delay-lines instead of memory condensers and are again withdrawn for sampling at the proper epoch. Either method of compensating for mechanical errors can be used in connection with the method of frequency division here described. It is obvious that the mechanically-initiated types of phase distortion must be compensated whatever the method used for splitting the frequency band, if avoidance of phase distortion in the latter process is to have its effect.

It will be recognized that the method of band-splitting described herein has features in common with both the frequency-shifting and sampling techniques as heretofore employed. Prior frequency shift methods required that the higher-frequency bands to be represented be separated by filtering before being heterodyned down to the required band, with the phase-distortion difficulties that this implies. The heterodyning or carrier frequency used was always at the edge of the band modulated upon it, and it might or might not be a frequency that is below cut-off—usually it was not. With this method, since only one side-band of the modulation was recorded, no "channel saving" method of using redundant information was available.

With "pure" sampling methods the sampling frequency used in each channel must be one which can itself be recorded, as the D.C. component of the original signal is represented in the record by a component of sampling frequency. This is the highest frequency reproduced, and the frequency with the highest average amplitude. Therefore, although "channel saving" is possible with the pure sampling method it results in flicker of maximum amplitude over maximum area. Drop-outs are clearly visible in the reproduced visual signals unless rather elaborate precautions are taken to compensate for them.

With the method of the present invention the sampling frequency lies at the center of the band of higher frequencies represented by a given channel, and the sampling is done at a frequency that is not reproducible on the apparatus used; i.e., that is at least twice the cutoff frequency. The directly-recorded low frequencies minimize the effect of drop-outs. The equipment necessary is minimized, both by using the very frequency limitations which make band-splitting necessary to accomplish the band-splitting, thus avoiding the use of wave-filters and their phase-distortion, and by eliminating one channel through the use of the redundant information in the picture signal.

It may be noted that although carrier suppressing modulation was described in both the recording and reproducing samplings, it is really necessary only in reproduction, since the carrier frequency is filtered out in reproduction, leaving only the same two sidebands, if amplitude modulation is employed without carrier suppression. This, however, reduces the dynamic range of the recording medium and therefore although usable it is not recommended.

The apparatus here described can be modified in numerous ways in order to accomplish the applicant's method of dissecting and reproducing wide band signals. It is therefore not intended that the invention be limited to the use of the actual apparatus described, intended limitations being expressed specifically in the following claims:

I claim:

1. The method of recording wide-band signals as tracks on a moving recording medium and reproducing said signals with apparatus having a high-frequency cutoff at a frequency lower than substantially all of the component frequencies in the band to be reproduced from said tracks, and said band being wider than the band between zero and said cutoff frequency, which comprises the steps of cyclically sampling the signals within said band to produce a train of waves consisting of samples which are alternately of the same polarity as the sampled signal at the instant of sampling and of opposite polarity thereto, the sampling repetition rate being substantially equal to the lowest frequency in the band to be reproduced plus the cutoff frequency of said apparatus, applying said train of waves to produce a record track on said medium, producing from said track with said apparatus a resultant wave comprising frequency components of said wave train lower than said cutoff frequency, and sampling the wave so produced in the same manner as said first mentioned sampling and at the same relative frequency and phase with respect to the components of said wave to produce a signal representative in relative phase and amplitude of the components of the original signals within the limits of said first mentioned band.

2. The method of recording wide-band signals as tracks on a moving recording medium and reproducing said signals with apparatus having a high-frequency cutoff at a frequency lower than substantially all of the component frequencies in the band to be reproduced from said tracks, and said band being wider than the band between zero and said cutoff frequency, which comprises the steps of cyclically sampling the signals within said band to produce a train of waves consisting of samples which are alternately of the same polarity as the sampled signal at the instant of sampling and of opposite polarity thereto, the sampling repetition rate being substantially equal to the lowest frequency in the band to be reproduced plus the cutoff frequency of said apparatus, and the interval between samples being substantially equal to the length of the samples, applying said train of waves to produce a record track on said medium, producing from said track with said apparatus a resultant wave comprising frequency components of said wave train lower than said cutoff frequency, and sampling the wave so produced in the same manner as said first mentioned sampling and at the same relative frequency and phase with respect to the components of said wave to produce a signal representative in relative phase and amplitude of the components of the original signals within the limits of said first mentioned band.

3. The method of recording wide-band signals as tracks on a moving recording medium for reproduction on apparatus having a high-frequency cutoff at a frequency lower than substantially all of the component frequencies in the band to be reproduced from said tracks which comprises the steps of cyclically sampling the signals within said band to produce a train of waves consisting of samples which are alternately of the same polarity as the sampled signal at the instant of sampling and of opposite polarity thereto, the sampling repetition rate being substantially equal to the lowest frequency in the band to be reproduced plus the cutoff frequency of said apparatus, and applying said entire train of waves to produce a record track on said medium.

4. The method of recording wide-band signals as tracks on a moving recording medium and reproducing from said tracks, a band of signals including higher-frequency components only of said signals, with apparatus having a high frequency cutoff at a frequency lower than substantially all of the component frequencies in the band to be reproduced from said tracks which comprises the steps of cyclically sampling the entire band of signals to produce a train of waves consisting of samples which are alternately of the same polarity as the sampled signal at the instant of sampling and of opposite polarity thereto, the sampling rate being substantially equal to the lowest frequency in the band to be reproduced plus the cutoff frequency of said apparatus, applying said entire train of waves to produce a record track on said medium, producing from said track with said apparatus a resultant wave comprising frequency components of said wave train lower than said cutoff frequency, and sampling the wave so produced in the same manner as said first mentioned sampling and at the same relative frequency with respect to the components of said wave to produce a signal representative in relative phase and amplitude of the components of the higher frequency components of original wide-band signals.

5. The method of subdividing television and like wide-band signals for recording as a plurality of parallel tracks on a moving recording medium and of reproducing said signals with apparatus having a high-frequency cutoff materially lower than the higher-frequency components thereof which comprises the steps of dividing said signals into a plurality of channels, the signals in each channel including all component frequencies in the band to be reproduced, recording the signals in one of said channels directly as one of the tracks on said medium, sampling the signals in another of said channels to produce a wave train consisting of samples which are alternately of the same polarity as the sampled signal at the instant of sampling and of opposite polarity thereto, the repetition rate of samplings in the same phase being substantially an integral multiple of said cutoff frequency, recording said wave train as a second track simultaneously with the recording of the signals in said first identified channel, simultaneously producing from said tracks waves representative of the component frequencies recorded thereon below said cutoff frequency, sampling the signal so produced from said second track in the same manner and at the same relative frequency and phase as said first mentioned sampling to produce a new wave train wherein alternate samples are re-inverted into their original phase, and mixing the waves and wave train so produced from the two tracks to reconstruct substantially the original signals.

6. The method of subdividing television and like wide-band signals produced by scanning an area repeatedly at a line and a field rate, for recording as a plurality of parallel tracks on a moving recording medium and of reproducing said signals with apparatus having a high-frequency cutoff materially lower than the higher-frequency components thereof which comprises the steps of dividing said signals into a plurality of channels, the signals in each channel including all component frequencies in the band to be reproduced, recording the signals in one of said channels directly as one of the tracks on said medium, sampling the signals in another of said channels to produce a wave train consisting of samples which are alternately of the same polarity as the sampled signal at the instant of sampling and of opposite polarity thereto, the repetition rate of samplings in the same phase being substantially an integral multiple of said cutoff frequency, and an odd harmonic of one-quarter of said line scanning rate, recording said wave train as a second track simultaneously with the recording of the signals in said first identified channel, simultaneously producing from said tracks waves representative of the component frequencies recorded thereon below said cutoff frequency, sampling the signal so produced from said second track in the same manner and at the same relative frequency and phase as said first mentioned sampling to produce a new wave train wherein alternate samples are re-inverted into their original phase, and mixing the waves and wave train so produced from the two tracks to reconstruct substantially the original signals.

7. The method of subdividing television and like wide-band signals for recording as a plurality of parallel tracks on a moving recording medium and of reproducing said signals with apparatus having a high-frequency cutoff materially lower than the higher-frequency components thereof which comprises the steps of dividing said signals into a plurality of channels, the signals in each channel including all component frequencies in the band to be reproduced, recording the signals in one of said channels directly as one of the tracks on said medium, sampling the signals in a second channel to produce a wave train consisting of samples which are alternately of the same polarity as the sampled signal at the instant of sampling and of opposite polarity thereto, the repetition rate of samplings in the same phase being substantially an integral multiple of said cutoff frequency, sampling the signals in a third channel in the same manner as in said second channel, the samples in said third channel alternating with the samples in said second channel, recording the wave trains in said second and third channels simultaneously with the recording of the signals in said first identified channel to produce second and third tracks on said medium, simultaneously producing from all of said tracks waves representative of the component frequencies recorded thereon below said cutoff frequency, sampling the waves so produced from said second and third tracks in the same manner and at the same relative frequency and phase as said first mentioned samplings to produce new wave trains wherein alternate samples are re-inverted into their original phase, and, mixing the waves and wave train so produced from the three tracks to reconstruct substantially the original signals.

8. The method of recording television and like wide-band signals with apparatus wherein said signals are applied through a plurality of recording heads to a recording medium moving over said heads at substantially constant speed to develop thereon a plurality of parallel record tracks and reproducing said signal from said tracks with apparatus having a like number of reproducing heads engaging said tracks, the speed of said medium with respect to said reproducing heads being such that said reproducing apparatus has a cutoff frequency which is a fraction of the highest frequency components of the signal frequencies to be reproduced, which comprises the steps designated as steps (*a*) to (*h*) and defined as follows:

Step (*a*): Developing an oscillation of substantially said cutoff frequency;

Step (*b*): Developing a second oscillation of an integral multiple of said cutoff frequency and of constant phase relation to the oscillation developed in step (*a*);

Step (*c*): Amplitude-modulating the entire band of signals to be reproduced on the oscillation developed in step (*b*) as a carrier to produce a wave of side-band frequencies;

Step (*d*): Simultaneously applying the entire band of signals to be recorded to a first of said recording heads, the wave developed in step (*c*) to a second of said recording heads and at least a portion of the oscillation developed in step (*a*) to a third of said recording heads while progressing said medium over said heads to produce a first, a second and a third record track respectively;

Step (*e*): Progressing said medium over a first, a second and a third of said reproducing heads to produce from the correspondingly designated record tracks wave trains representing the components of cutoff and lower frequencies respectively recorded thereon:

Step (*f*): Developing from the wave train produced from said third track an oscillation substantially identical to the oscillation developed in step (*b*) in frequency and in phase relation to the components from said second track;

Step (*g*): Demodulating the wave train produced from said second track with the oscillation developed in step (*f*) as a suppressed carrier; and Step (*h*): Adding the wave train produced from said first track to the demodulated wave train resulting from step (*g*) to produce a combined wave carrying the information required to reproduce substantially the original signal.

9. The method defined in claim 8 of recording signals produced by cyclically scanning a field in two dimensions at line and frame frequencies respectively, wherein the oscillations developed in steps (*b*) and (*f*) are of a frequency which is an odd harmonic of one quarter of said line frequency.

10. The method of recording television and like wide-band signals with apparatus wherein said signals are applied through a plurality of recording heads to a recording medium moving over said heads at substantially constant speed to develop thereon a plurality of parallel record tracks and reproducing said signal from said tracks with apparatus having a like number of reproducing heads engaging said tracks, the speed of said medium with respect to said reproducing heads being such that said reproducing apparatus has a cutoff frequency which is a fraction of the highest frequency components of the signal frequencies to be reproduced, which comprises the steps designated as steps (*a*) to (*h*) and defined as follows:

Step (*a*): developing an oscillation of substantially said cutoff frequency;

Step (*b*): Developing two further oscillations in phase quadrature and of an integral multiple of said cutoff frequency and each having a constant phase relation to the oscillation developed in step (*a*);

Step (*c*): Amplitude-modulating the entire band of signals to be reproduced on each of the oscillations developed in step (*b*) as a carrier to produce two waves of side-band frequencies;

Step (*d*): Simultaneously applying the entire band of signals to be recorded to a first of said recording heads, the waves developed in step (*c*) to a second and third of said recording heads and at least a portion of the oscillation developed in step (*a*) to a fourth of said recording heads while progressing said medium over said heads to produce first, second, third and fourth record tracks respectively;

Step (*e*): Progressing said medium over a first, a second, a third and a fourth of said reproducing heads to produce from the correspondingly designated record tracks wave-trains representing the components of cutoff and lower frequencies respectively recorded thereon;

Step (*f*): Developing from the wave train produced from said fourth track two oscillations substantially identical to the oscillations developed in step (*b*) in frequency and in phase relation to the couponents produced from said second and third tracks;

Step (*g*): Demodulating the wave train produced from said second and third tracks with the oscillations developed in step (*f*) as suppressed carriers; and Step (*h*): Adding the wave train produced from said first track to the demodulated wave trains resulting from step (*g*) to reproduce substantially the original signal.

11. In the art of recording television and like signals comprising a wide band of frequencies as a plurality of parallel tracks on a tape recording medium progressed substantially constant speed over a plurality of recording heads and reproducing said signals by progressing said tape at substantially the same constant speed over a like number of reproducing heads each engaging one of said tracks, the speed of said medium with respect to said heads being such that there is a high-frequency cutoff of the reproduced signals at a fraction of the highest frequency components of said television signals, the method of dividing said television signals into a plurality of component bands in recording and re-assembling said signals in reproduction substantially without phase distortion which comprises the steps designated as steps (*a*) to (*j*) and defined as follows:

Step (*a*): Developing an oscillation of substantially said cutoff frequency;

Step (*b*): Developing a second oscillation of an integral multiple of said cutoff frequency and of constant phase relation to the oscillation developed in step (*a*);

Step (*c*): Amplitude-modulating the entire band of signals to be reproduced on the oscillation developed in step (*b*) as a carrier to produce a wave of side-band frequencies;

Step (*d*): Developing a reference signal of constant timing and adding said reference signal to both the wave produced in step (*c*) and to the entire band of signals to be recorded;

Step (*e*): Simultaneously applying entire band of signals to be recorded to a first of said recording heads, the wave developed in step (*c*) to a second of said recording heads, including said reference signal in both, and at least a portion of the oscillation developed in step (*a*) to a third of said recording heads while progressing said medium over said heads to produce a first, a second and a third record track respectively;

Step (*f*): Progressing said medium over a first, a second and a third of said reproducing heads to reproduce from the correspondiigly designated record tracks wave-trains representing the components of cutoff and lower frequencies respectively recorded thereon;

Step (*g*): Developing from the wave train produced from said third track an oscillation substantially identical to the oscillation developed in step (*b*) in frequency and constant phase;

Step (*h*): Delaying the wave trains produced from said first and second tracks for variable intervals to bring the reference signal components therein into the same phase relation with the constant phase of the oscillation developed in step (*g*) in substantially the same relation to the components of the wave train produced from said second track as that of the oscillation developed in step (*b*) to corresponding components of the band of signals to be recorded;

Step (*i*): Demodulating the delayed wave train produced from said second track with the oscillation developed in step (*g*) as a suppressed carrier; and Step (*j*) Adding the wave train produced from said first track to the demodulated wave train resulting from step (*i*) to produce a combined wave carrying the information required to reproduce substantially the original signal.

12. In the art of recording television and like signals comprising a wide band of frequencies produced by scanning a field in two dimensions, as a plurality of parallel tracks on a tape recording medium progressed at substantially constant average speed over a plurality of recording heads and reproducing said signals by progressing said tape at substantially the same constant average speed over a like number of reproducing heads each engaging one of said tracks, the speed of said medium with respect to said heads being such that there is a high-frequency cutoff of the reproduced signals at a fraction of the highest frequency components of said television signals, the method of dividing said television signals into a plurality of component bands in recording and re-assembling said signals in reproduction substantially without phase distortion from either electrical effects or deviation of record speed from its average value which comprises the steps designated as steps (*a*) to (*i*) and defined as follows:

Step (*a*): Developing an oscillation of substantially said cutoff frequency;

Step (*b*): Developing a second oscillation of an integral multiple of said cutoff frequency and of constant phase relation to the oscillation developed in step (*a*);

Step (*c*): Sampling the entire band of signals to be reproduced by amplitude modulating said band on the oscillation developed in step (*b*) as a carrier to produce a wave of side-band frequencies the peak values whereof are proportional to the instantaneous values of the signals of said band reversed in polarity at alternate peaks;

Step (*d*): Simultaneously applying the entire band of signals to be recorded to a first of said recording heads, the wave developed in step (*c*) to a second of said recording heads and the oscillation developed in step (*a*) to a third of said recording heads while progressing said medium over said heads to produce a first, a second and a third record track respectively;

Step (*e*): Progressing said medium over a first, a second and a third of said reproducing heads to produce from the correspondingly designated record tracks wave trains representing the components of cutoff and lower frequencies respectively recorded thereon;

Step (*f*): Developing from the wave train produced from said third track an oscillation substantially identical to the oscillation developed in step (*b*) in frequency and constant in phase;

Step (*g*): Storing the wave trains produced from said first and second tracks and varying the times of storage to bring the components of said wave trains, representative of the same elements of the field scanned, into time coincidence with each other and the peaks of the wave trains produced from said second track into time coincidence with the peaks of the oscillations developed in step (*f*);

Step (*h*): Applying the oscillation developed in step (*f*) to sample the stored wave train produced from said second track at its peak values with alternate samples reversed in polarity; and Step (*i*): Adding the stored wave train produced from said first track to the samples taken in step (*h*) to produce a combined wave carrying the information required to reproduce visually substantially the original signal.

References Cited in the file of this patent

UNITED STATES PATENTS

| | | |
|---|---|---|
| 2,695,331 | Johnson | Nov. 23, 1954 |
| 2,698,875 | Greenwood | Jan. 4, 1955 |